United States Patent
Ollila

(10) Patent No.: US 10,400,449 B2
(45) Date of Patent: Sep. 3, 2019

(54) PARTITIONING SYSTEM FOR TEMPORARY AND FLEXIBLE-USE STRUCTURES

(71) Applicant: SkyPoint Ventures, LLC, Flint, MI (US)

(72) Inventor: David J. Ollila, Flint, MI (US)

(73) Assignee: SKYPOINT VENTURES, LLC, Flint, MI (US)

( * ) Notice: Subject to any disclaimer, the term of this patent is extended or adjusted under 35 U.S.C. 154(b) by 0 days.

(21) Appl. No.: 15/884,119

(22) Filed: Jan. 30, 2018

(65) Prior Publication Data

US 2018/0216343 A1 Aug. 2, 2018

Related U.S. Application Data

(60) Provisional application No. 62/452,032, filed on Jan. 30, 2017.

(51) Int. Cl.
*E04B 2/74* (2006.01)
*E04B 2/76* (2006.01)
*H02G 3/38* (2006.01)

(52) U.S. Cl.
CPC .......... *E04B 2/7433* (2013.01); *E04B 2/7435* (2013.01); *E04B 2/7459* (2013.01);
(Continued)

(58) Field of Classification Search
CPC ................. E04B 2/7433; E04B 2/7435; E04B 2002/749; E04B 2002/7446; E04B 2002/7496; E04B 2002/7461
(Continued)

(56) References Cited

U.S. PATENT DOCUMENTS 2,228,363 A * 1/1941 Pinney ...................... E04C 1/42
52/281
2,934,180 A 4/1960 Hammitt et al.
(Continued)

FOREIGN PATENT DOCUMENTS

DE 202006018839 U1 3/2007
EP 1048795 A2 2/2000
FR 3004478 A1 10/2014

OTHER PUBLICATIONS

Steel Case, Post & Beam Office & Room Partitions—Steelcase, www.steelcase.com/products/desk-systems/post-beam/, 2017.

*Primary Examiner* — Brian E Glessner
*Assistant Examiner* — Adam G Barlow
(74) *Attorney, Agent, or Firm* — LKGlobal|Lorenz & Kopf, LLP

(57) ABSTRACT

A temporary, non-fixed partitioning system includes a common assembly bracket that can be readily assembled with a wall panel formed of various standard dimensioned building supplies. The wall panels may include a standard door slab, a standard window sash, standard dimensional lumber, a peg board, a chalk board, a whiteboard, a corrugated cardboard panel, a foam board, a gator board, a fiberglass panel, a cork panel, a plastic panel, an upholstered panel, a wood panel, and an acrylic-based or silica-based glass panel, and may also be suitable for receiving custom or desired printing of designs, indicia or other nomenclature. The partitioning system could be provided in a kit form with a plurality of common assembly brackets and wall panels, which are reconfigurable for a variety of uses such as co-working space, trade show booths, or lobby displays.

14 Claims, 7 Drawing Sheets

(52) U.S. Cl.
CPC ............ *E04B 2/762* (2013.01); *H02G 3/388*
(2013.01); *E04B 2002/749* (2013.01); *E04B
2002/7446* (2013.01); *E04B 2002/7461*
(2013.01); *E04B 2002/7477* (2013.01); *E04B
2002/7488* (2013.01); *E04B 2002/7496*
(2013.01)

(58) Field of Classification Search
USPC .... 52/36.5, 36.6, 281, 282.2, 580, 581, 780, 52/781, 843–846
See application file for complete search history.

(56) References Cited

U.S. PATENT DOCUMENTS

| | | | |
|---|---|---|---|
| 3,195,698 A | | 7/1965 | Codrea |
| 3,261,625 A | * | 7/1966 | Cripe ..................... E04B 2/764 403/173 |
| D206,393 S | | 12/1966 | Deskey |
| 3,349,533 A | | 10/1967 | Gregoire |
| 3,371,454 A | | 3/1968 | Anderson |
| 3,377,756 A | * | 4/1968 | Polhamus ............. E04B 2/7453 138/166 |
| 3,386,216 A | | 6/1968 | Zwickert |
| 3,451,183 A | * | 6/1969 | Lespagnol .............. E04B 2/766 403/230 |
| 3,486,287 A | * | 12/1969 | Guillon ..................... E04B 2/78 52/239 |
| 3,565,152 A | | 2/1971 | Cohn et al. |
| 3,623,290 A | | 11/1971 | Downing, Jr. |
| 3,706,169 A | * | 12/1972 | Rensch ..................... E04B 1/24 52/263 |
| 3,733,759 A | * | 5/1973 | Schulte ..................... E04B 2/74 160/196.1 |
| 3,782,048 A | * | 1/1974 | Corman ............. A47B 96/1475 248/243 |
| 4,052,828 A | | 10/1977 | Mancini et al. |
| 4,084,367 A | * | 4/1978 | Saylor .................. B29D 24/005 428/113 |
| 4,295,307 A | | 10/1981 | Jensen |
| D273,548 S | | 4/1984 | Hollander |
| 4,667,450 A | * | 5/1987 | Stefnik ................. E04B 2/7409 52/238.1 |
| 4,680,902 A | * | 7/1987 | Stefnik ................. E04B 2/7409 52/126.4 |
| 5,069,263 A | | 12/1991 | Edwards |
| 5,242,241 A | * | 9/1993 | Nelson .................. E04B 2/7433 403/396 |
| 5,406,760 A | | 4/1995 | Edwards |
| 5,474,501 A | * | 12/1995 | Teng ........................ A63J 11/00 403/306 |
| 5,875,596 A | * | 3/1999 | Muller .................. E04B 2/7433 160/135 |
| 5,943,834 A | | 8/1999 | Jeffers et al. |
| 6,076,322 A | | 6/2000 | D'Andrea et al. |
| 6,115,977 A | * | 9/2000 | Hornberger .......... A47B 95/008 52/238.1 |
| 6,141,926 A | | 11/2000 | Rossiter et al. |
| 6,167,665 B1 | * | 1/2001 | Dame ................... E04B 2/7425 52/239 |
| 6,185,887 B1 | * | 2/2001 | Strassle ................ A47B 57/045 52/282.2 |
| 6,253,516 B1 | | 7/2001 | D'Andrea et al. |
| 6,295,764 B1 | | 10/2001 | Berridge et al. |
| 6,393,782 B1 | | 5/2002 | Berridge et al. |
| 6,493,995 B2 | * | 12/2002 | McKenzie ............. A47F 5/105 52/220.7 |
| 6,553,730 B1 | | 4/2003 | Mueller et al. |
| 6,802,171 B2 | * | 10/2004 | McKinnon ............. A47B 47/03 411/84 |
| D505,734 S | | 5/2005 | Rintamaki |
| D572,570 S | * | 7/2008 | Terada ............................ D8/354 |
| 7,461,484 B2 | | 12/2008 | Battey et al. |
| D616,035 S | | 5/2010 | Kosir et al. |
| D617,174 S | * | 6/2010 | Schaefer ....................... D25/122 |
| 7,762,023 B2 | * | 7/2010 | Kasdorf ................ E04B 2/7435 52/282.2 |
| D645,160 S | | 9/2011 | Loken |
| D660,021 S | | 5/2012 | Jacobs et al. |
| 8,381,468 B2 | * | 2/2013 | Koupal ................. E04B 1/6162 52/282.1 |
| D678,698 S | | 3/2013 | McLean et al. |
| 2003/0163967 A1 | | 9/2003 | Sims |
| 2003/0173472 A1 | * | 9/2003 | Liu ........................ A47B 17/02 248/125.2 |
| 2007/0193218 A1 | * | 8/2007 | Spransy ................ E04B 2/7453 52/782.1 |
| 2007/0197082 A1 | * | 8/2007 | Zeh ....................... A47B 83/001 439/404 |
| 2008/0110127 A1 | * | 5/2008 | Terada .................. E04B 2/7435 52/646 |
| 2008/0197092 A1 | * | 8/2008 | Terada ................... A47B 47/00 211/188 |
| 2008/0209827 A1 | | 9/2008 | Webb |
| 2011/0099929 A1 | | 5/2011 | Liegeois et al. |
| 2011/0192555 A1 | * | 8/2011 | Frezouls ............... E04B 2/7433 160/378 |
| 2013/0025220 A1 | | 1/2013 | Yu et al. |
| 2015/0233114 A1 | * | 8/2015 | Hoefler ................. E04B 2/7433 52/239 |

* cited by examiner

PARTITIONING SYSTEM FOR TEMPORARY AND FLEXIBLE-USE STRUCTURES

CROSS-REFERENCE TO RELATED APPLICATIONS

This application claims the benefit of U.S. Provisional Application No. 62/452,032, filed on Jan. 30, 2017. The entire disclosure of the above application is incorporated herein by reference.

TECHNICAL FIELD

The present disclosure relates generally to an indoor/outdoor partitioning or temporary structure configuration system for use in branding/business development, short-term interior construction, disaster-relief, emergency preparedness, epidemiological and biohazard containment uses, fair and festival events, governmental administration, health care and medical treatment, temporary event displays and housing, trade show presentations, workspace solutions, and/or related applications and, more particularly, to an easy-to-assemble, flexible, and modular short-term, specific use, and/or temporary workspace solution that utilizes an assembly bracket configured to receive various panels for constructing a partitioning system

BACKGROUND

This section provides background information related to the present disclosure which is not necessarily prior art.

Open areas and venues, including large office spaces and other open and/or temporary work and display areas may be divided into smaller or discrete workspaces or workstations by various types of partitioning systems. Such systems typically include interconnected wall panels that subdivide an office space into multiple smaller workspaces. Systems of this type are often preferred over traditional interior build outs using permanent architectural building walls such as with studs and drywall. Known partitioning system can be effectively used to subdivide a building space, and at the same time provide flexibility for reconfiguring the office space.

In subdividing open office areas into individual workstations, the individual wall panels typically include a complex coupling mechanism that is concealed when the panels are joined in an end-to-end manner. Different coupling mechanisms are required when it is desirable to join panels in a perpendicular matter. Typically, a common panel construction is used to construct all of the walls of the workstations. While such systems, more commonly known in the prior art as "cubicles" provide segregated workstations for a variety of uses, they are also known to lack options or other customizable features and display formats lack that may be desirable for some business or other vocational applications.

SUMMARY

In accordance with the present disclosure, a simplified buildable and modular solution is provided for a variety of indoor and outdoor business, event, and task-oriented, and workspace functions using a temporary, non-fixed partitioning system having a common assembly bracket that can be readily assembled with infill or wall panels selected from various standard dimensioned building supplies to form a partitioning system. The partitioning system could be provided in a kit form with a plurality of common assembly brackets and wall panels, which are reconfigurable for a variety of uses such as co-working space, trade show booths, or lobby displays.

In addition, the present disclosure provides an expandable, flexible, and modular short-term or temporary construction system which can be adapted for use in a large variety of indoor and outdoor locations to not only facilitate business, furniture, office, and work-related needs and tasks, but also deployment of specific-use and temporary structures to aid and respond to needs in the area of disaster-relief, emergency preparedness, epidemiological and biohazard containment uses, fair and festival events, governmental administration, health care and medical treatment, temporary event displays and even short-term housing of others. The present disclosure also allows for the configuration, design, and printing on the panels and other components of the partitioning system to allow for customized or specific uses, such as cultural and ethnic content, language, murals, photographs, and symbols, children's playrooms and temporary "themed" structures, dressing rooms for performances, historical and educational-themed content, athletic team and alumni events, and business conference content. While it is contemplated that the majority of such applications and uses of the present disclosure would be placed in the interior portion of an existing building or structure, the system could also be adapted for temporary and/or recurring outdoor events or festivals by securing the system to the ground or attaching portions of it to nearby and existing fixed structures. Still further, the present disclosure allows for the configuration, design, and use as articles of furniture and other functional products having horizontal and/or vertical surfaces, such as beds, benches, chairs, desks, tables, conference room furniture, reception areas, seating areas, kiosks, and displays. For example, the expandable, flexible, modular nature of the present disclosure and system can be adapted to variety of configurations and designs for household and office furniture applications. Moreover, the expandable, flexible, modular nature of such systems may be configured to provide a structure which is freestanding or alternately a structure that is attached to adjacent structures.

The system includes a common assembly bracket configured to be readily formed by an extrusion process while maintaining sufficient structural rigidity for securely supporting the wall panels either in a freestanding configuration or through compression support between a floor structure and a ceiling structure. In one configuration, the assembly bracket has a hash mark or tic-tac-toe board cross section including a closed central section and four sets of flanges extending outwardly from the from the central section. The flanges are laterally offset with respect to the walls forming the central section and fillets are formed at the joint between the central section and the flanges. A set of internal webs triangulate the central section to provide additional structural rigidity for the assembly bracket. The assembly bracket may be configured to provide two sets of flanges extending from the closed central section in a parallel or perpendicular orientation or to provide three sets of flanges extending from the closed central section in an angular orientation.

A threaded bore may be provided at one or both ends of the common assembly bracket to receive a foot or height adjustment element. The threaded bore may be formed in a plug or end cap secured within the central section or may be formed in a boss supported by the set of internal webs within the central section. The foot or height adjustment element includes a threaded shank portion received in the threaded bore and an enlarged head portion formed on an end thereof.

The spacing between each set of flanges on the common assembly bracket is dimensioned to releasably receive a wall panel. In one configuration, the common assembly bracket is dimension to receive building materials having a standardize thickness. For example, the wall panel may include standard 1⅜" thick door slabs or window sashes and/or framing using various other materials with little or no modifications. While this thickness may be preferable as standard configurations, it should be recognized that the gauge or thickness of the infill or wall panels may vary depending upon the desired use and application, as well as the underlying dimensions of the indoor or outdoor space to be utilized. Examples of wall panel configurations or types may include peg board, chalk board, whiteboard, corrugated cardboard, foam board, gator board, fiberglass, cork, plastic, fabric, wood, acrylic-based or silica-based glass, etc. The chosen wall panel may also be capable of being waxed, colored, printed-upon or receiving wood or other veneers for the desired look and feel, such as a camouflage design for hunting, shanty, and/or other recreational uses as well as flame-resistant panels for industrial and manufacturing applications. Alternately, a shim may be inserted into the common assembly bracket to accommodate thinner wall panels. The shim dimensions will be dependent on the difference between the flange spacing an the infill or wall panel thickness. For example, shims may be used to accommodate various wall panels having thicknesses in a range from about ½" to about 1⅜". Fasteners may be inserted through the assembly bracket into the wall panels for securing attaching these components together.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. There is no intention to be limited by any principle presented in the preceding background or the following detailed description.

Figure 1:
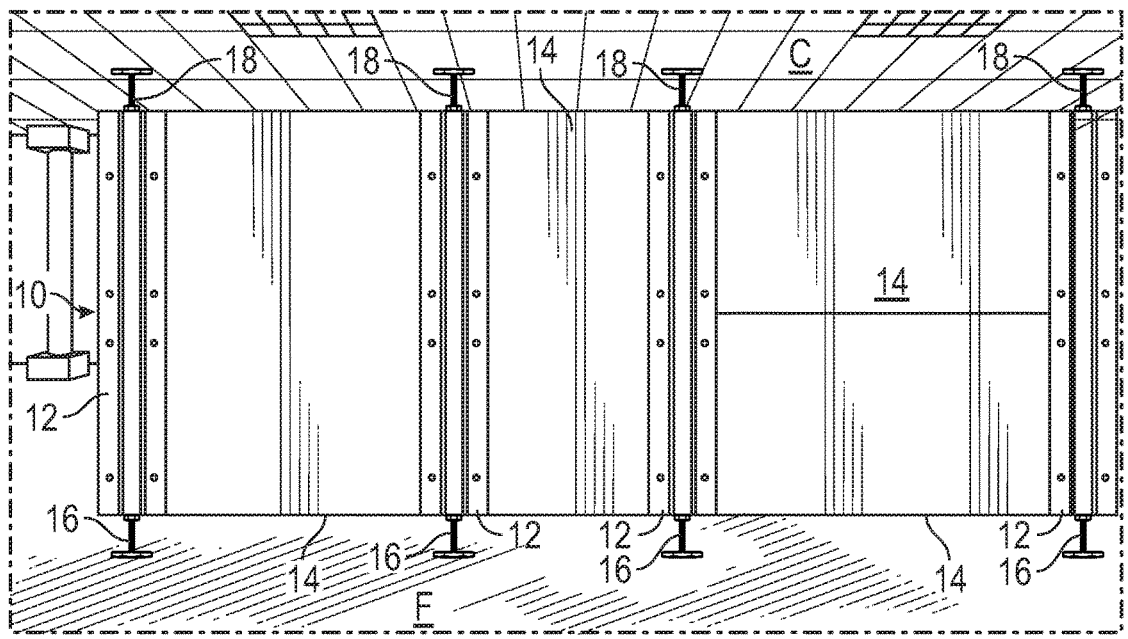
FIG. 1 is an elevation showing a temporary, non-fixed partitioning system including a common assembly bracket and a variety of panels supported within an open building space.

With reference now to FIG. 1, a temporary, non-fixed partitioning system 10 includes a plurality of common assembly brackets 12 and a variety of infill or wall panels 14 extending between adjacent assembly brackets 12. Feet 16 may extend from the bottom of the assembly brackets 12 to support the partitioning system 10 on the floor within an open building space in a freestanding manner. Height adjustment elements 18 may also extend from the top of the assembly brackets 12 to the ceiling for further securing the partitioning system 10 in the open building space. As shown in FIG. 1, the wall panels 14 may be constructed in different lengths and widths (i.e., surface area) or from diverse materials based on the specifications and desired effect for the partitioning system 10. However, as further detailed below, the panels 14 have a constant thickness, preferably standard dimensioned building supplies such as standard door slabs having a thickness of 1⅜" or 2× dimensional lumber having a nominal thickness of 1½".

Figure 2:
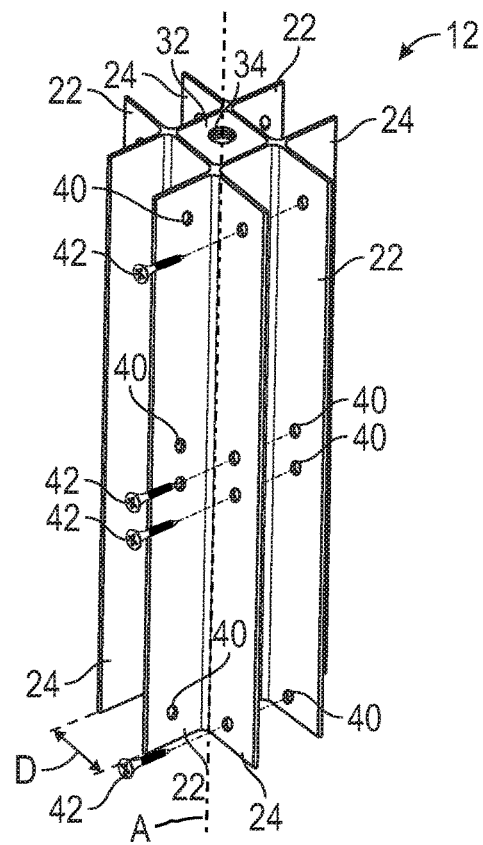
FIG. 2 is a perspective view of the assembly bracket shown in FIG. 1.

With reference now to FIG. 2, the assembly bracket 12 is an elongated member that may vary in length depending on the desired height of partitioning system 10. For example, in an open building space having nine foot high ceilings, the assembly bracket may be eight (8) feet in length such that the partitioning system 10 may be adequately spaced from the ceiling to provide clearance for building utilities (e.g., electrical, HVAC, fire suppression) that may traverse the room. Assembly bracket 12 of different lengths may be used to construct half-walls or other partition configurations.

Figure 3:
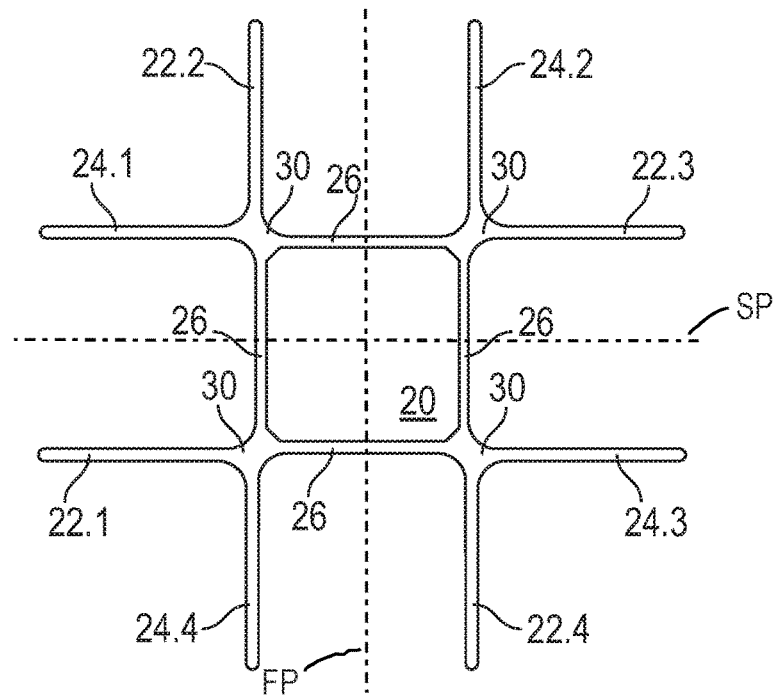
FIG. 3 is a cross section taken through the assembly bracket shown in FIG. 2.

With reference to FIG. 3, the assembly bracket 12 includes a closed central section 20 and a first pair of flanges 22.1, 24.1, a second pair of flanges 22.2, 24.2, a third pair of flanges 22.3, 24.3 and a fourth pair of flanges 22.4, 24.4 (collectively referred to as flanges 22, 24) extending outwardly from the central section 20. The first pair of flanges 22.1, 24.1 and the third pair of flanges 22.3, 24.3 are symmetric about a first plane FP passing through a longitudinal axis A of the assembly bracket. The second pair of flanges 22.2, 24.2 and the fourth pair of flanges 22.4, 24.4 are symmetric about a second plane SP passing through the longitudinal axis A of the assembly bracket 12. The second plane SP is perpendicular to the first plane FP. The assembly bracket 12 is configured to receive up to four wall panels. In this manner, the central section 20 forms a square cross section and flanges 22, 24 extend outwardly from each side of the central section 20 to form a hash mark or tic-tac-toe board cross section. The flanges 22, 24 are laterally offset with respect to the walls 26 forming the central section 20. Fillets 30 are formed at the joint between the flanges 22, 24 and the walls 26.

Figure 4:
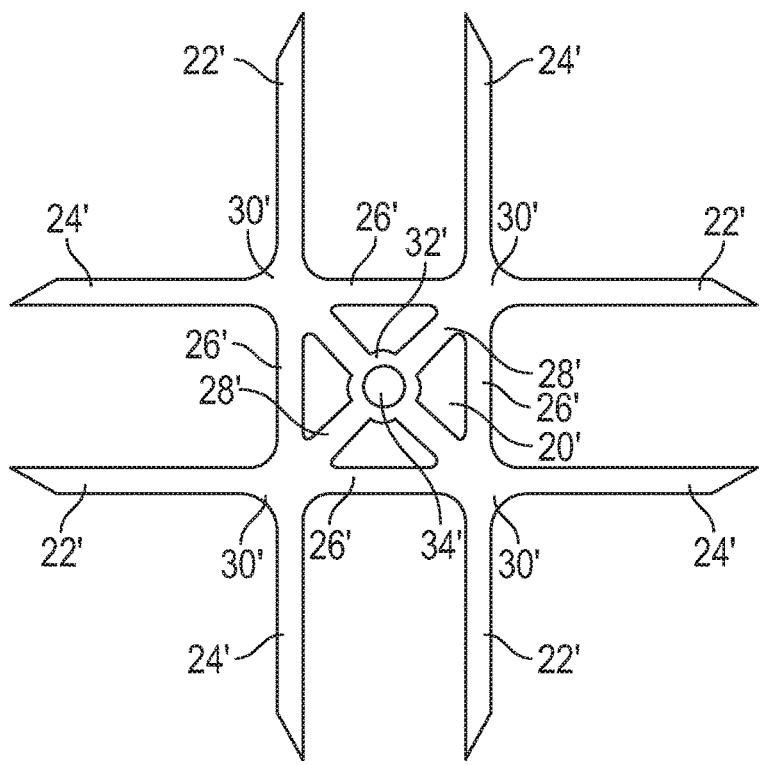
FIG. 4 is a cross section of an alternate configuration for the assembly bracket.

FIG. 4 illustrates the assembly bracket 12' in an alternate form that includes a closed central section 20' and flanges 22', 24' extending outwardly from the central section 20'. The assembly bracket 12' is configured to receive up to four wall panels. In a preferred embodiment, the central section 20 forms a square cross section and flanges 22', 24' extend outwardly from each side of the central section 20' to form a hash mark or tic-tac-toe board cross section. The central section 20' has internal webs 28' formed therein to triangulate the walls 26' for providing additional structural rigidity to the assembly bracket 12'. Fillets 30' are formed at the joint between the flanges 22', 24', the walls 26' and the internal webs 28'.

Figure 5A:
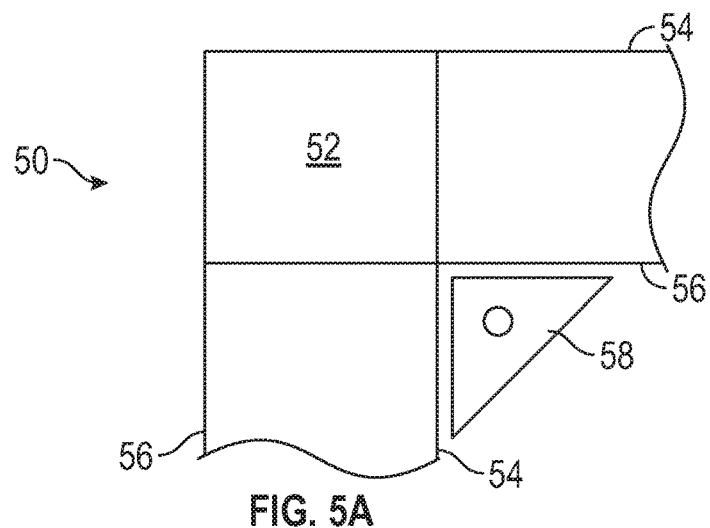
FIG. 5A is a schematic cross section of a 90° version of the assembly bracket.
Figure 5B:
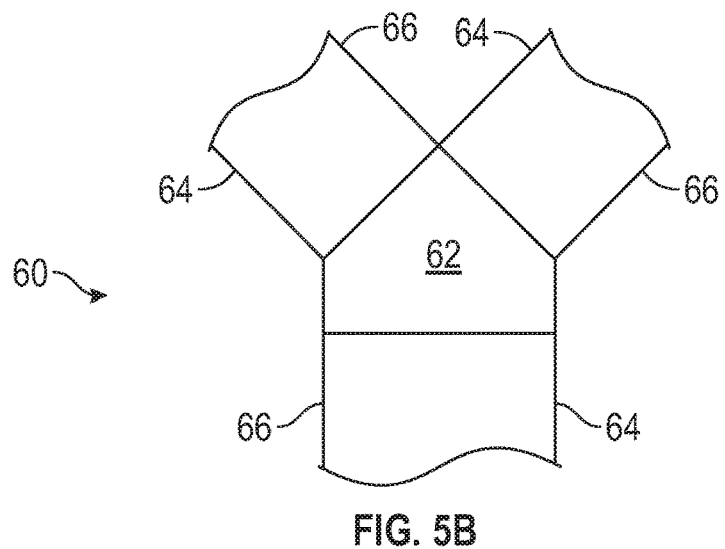
FIG. 5B is a schematic cross section of a 45° version of the assembly bracket.
Figure 5C:
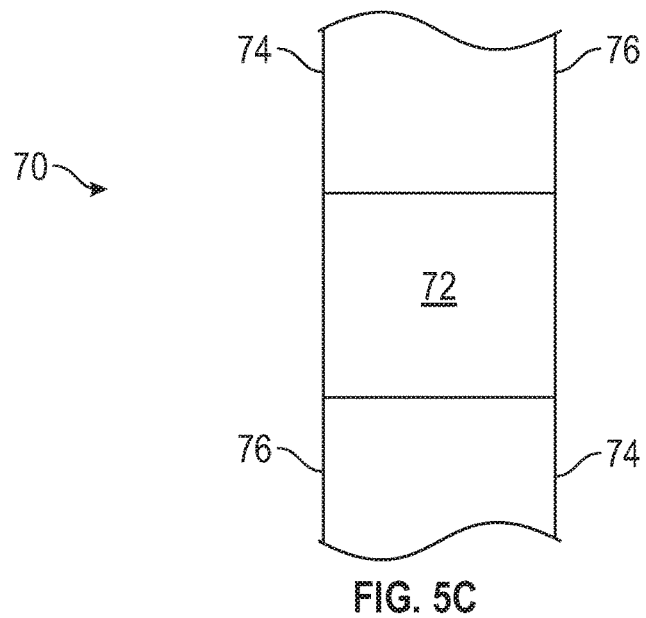
FIG. 5C is a schematic cross section of a "H" bracket design configuration of the assembly bracket.

FIGS. 5A-5C schematically illustrate assembly brackets 50, 60, 70, which are structurally similar to the bracket 12 shown in FIG. 3 or bracket 12' shown in FIG. 4, but provide alternate configuration. The assembly bracket 50 as shown in FIG. 5A is configured as a 90° assembly bracket for receiving up to two wall panels in a perpendicular orientation. Assembly bracket 50 includes a closed central section 52 and flanges 54, 56 extending outwardly from the central section 52. A corner support 58 is shown extending between flanges 54, 56 for accommodating a horizontal surface such as a bench, seat, shelf or other desired structure for the user. The assembly bracket 60 as shown in FIG. 5B is configured to receive up to three wall panels in an angular orientation. Assembly bracket 60 includes a closed central section 62 and flanges 64, 66 extending outwardly from the central section 62. The assembly bracket 70 as shown in FIG. 5C is configured to receive up to two wall panels in a parallel orientation. Assembly bracket 70 includes a closed central section 72 and flanges 74, 76 extending outwardly from the central section 72. The assembly bracket 70 is configured to receive up to two wall panels in a parallel orientation.

With reference again to FIG. 2, a plug 32 is disposed in the central section 20 and secured at an end of the assembly bracket 12 by any suitable means including frictional engagement, mechanical fasteners, adhesives or the like. A threaded bore 34 may be formed in the plug 32 for receiving a threaded shank 36 (FIGS. 1 and 9) associated with a foot 16 or height adjustment element 18. A head 38 formed at the end of the shank 36 provides a load bearing surface for supporting the assembly bracket 12 between the floor F and/or ceiling C. The head 38 may be covered or coated with a pliable material to prevent slippage and/or marring at the contact interface. With reference again to FIG. 4, a boss 32' having a threaded bore 34' may be formed in the internal webs 28' for receiving the threaded shank 36 of a foot or height adjustment element as described above.

Figure 6:
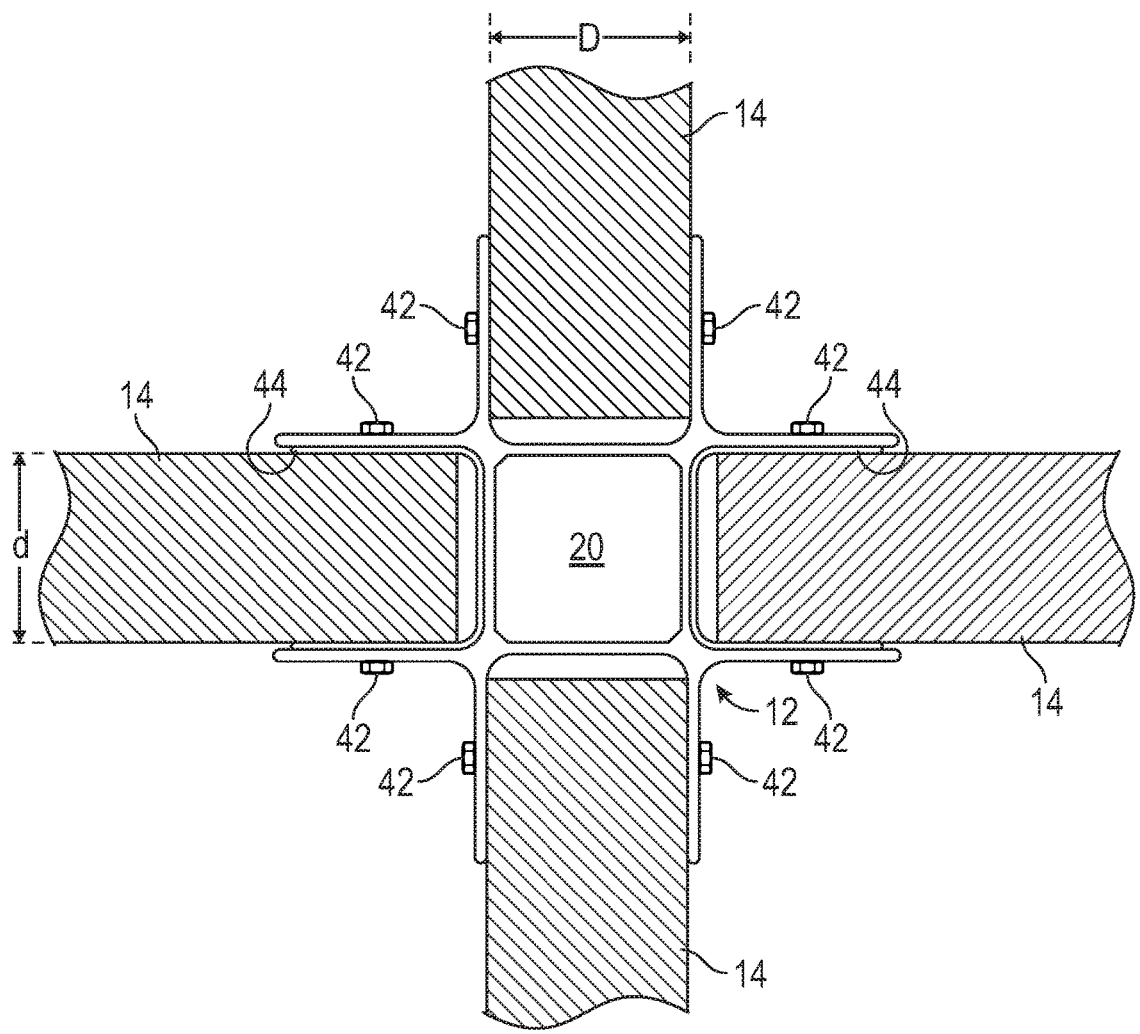
FIG. 6 is a cross section showing the assembly bracket with a shim to accommodate wall panels of various thicknesses.

With reference now to FIG. 6, the assembly bracket 12 is configured to receive an edge of the wall panel 14 between the flanges 22, 24. A fastener 42 (also shown in FIG. 2) may be inserted into one or more holes 40 extending through the flanges 22, 24 and into the wall panel for releasably securing these components together. Alternately, fastener 42 may be a self-drilling/tapping fastener used to secure the assembly bracket 12 to the wall panel 14 without requiring pre-drilled holes. The distance D between the inside surfaces of flanges 22, 24 is configured to receive standard dimensioned building supplies, and preferably the distance D is 1½" so that it receives a standard door slab, window sash or various other materials with little or no modifications. Other wall panel configurations may include peg board, chalk board, whiteboard, corrugated cardboard, foam board, gator board, fiberglass, cork, plastic, fabric, wood, acrylic-based or silica-based glass, etc. In some circumstances, the thickness d of the wall panel 14 may be less that the distance D, in which case a shim 44 may be used on the edge of the panel 14 such that it has a nominal dimension equal to the distance D, for example 1½". Furthermore, the wall panel may be laminated, coated, painted or pre-treated, for example to provide a fire-retardant quality. The wall panel may also be printed with designs, logos, images, lettering or the like. A particularly cost-effective embodiment uses 1½" thick corrugated cardboard wall panels 14 with the assembly brackets 12 to provide a relatively lightweight partitioning system 10 that is also recyclable.

Figure 7:
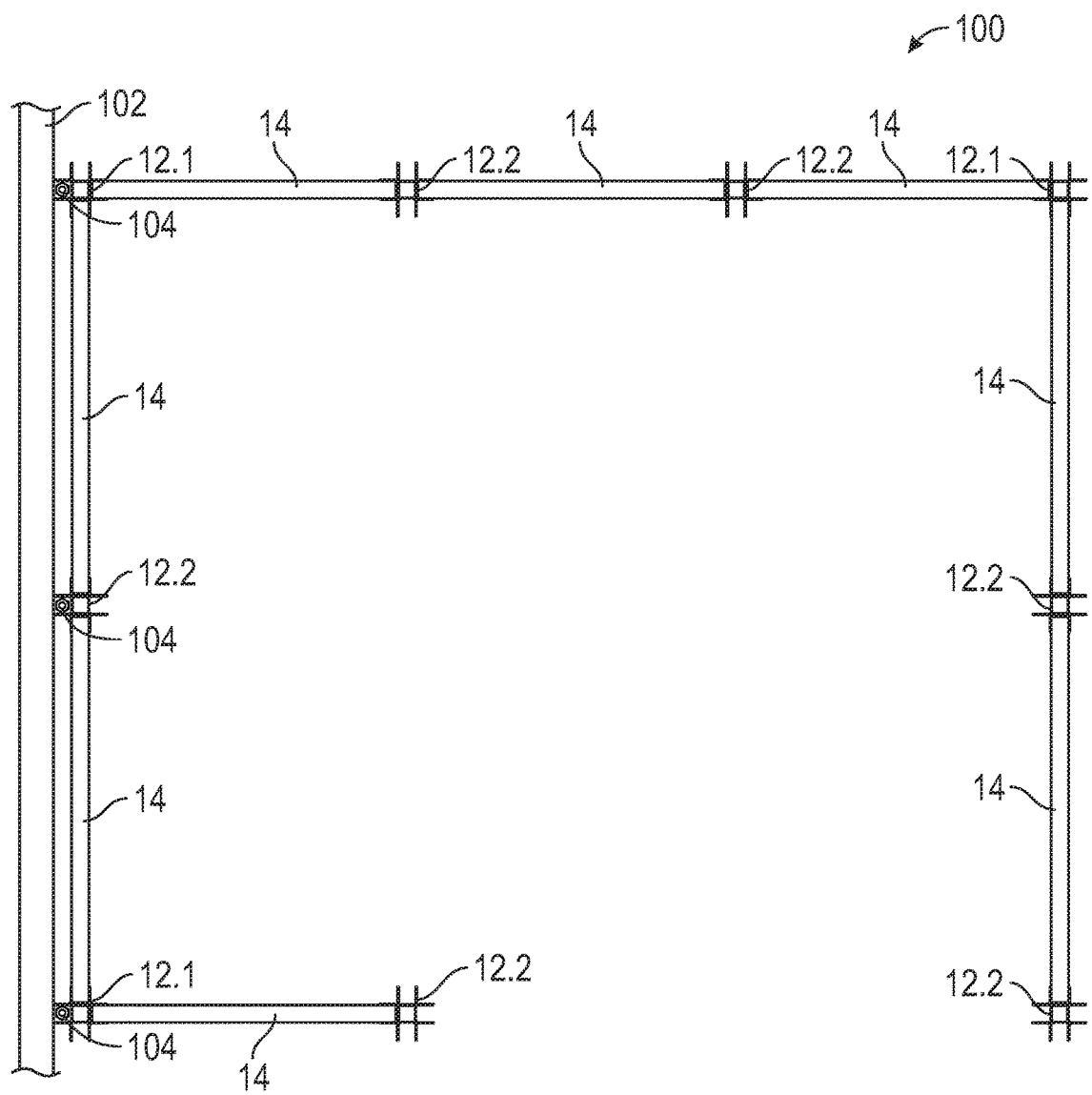
FIG. 7 is a schematic plan view showing an exemplary lay out for a temporary space.

One skilled in the art will appreciate that the partitioning system 10 may be readily configured in a multitude of lay outs with various functionality depending on the intended purpose of the workspace solution. For example, FIG. 7 illustrates a partitioning system 100 configured as rectangular interior office layout. Four assembly brackets 12.1 serve as corner posts, three of which receive a pair of wall panels 14 oriented at 90°. Four additional assembly brackets 12.2 serve as intermediate wall studs and each receives a pair of wall panels oriented at 180°. While different reference numbers are assigned to the corner brackets 12.1 and the intermediate wall studs 12.2, one skilled in the art will understand that these assembly brackets may be selected from the assembly brackets shown and described in reference to FIGS. 3, 4 and 5A-5C based on the configuration, functionality and/or availability of any given assembly bracket. As shown in FIG. 7, the partitioning system 100 is positioned adjacent to a fixed wall 102 in the building space. In this arrangement, it may be advantageous to provide a gasket or seal 104 in the flanges of the assembly brackets 12 extending towards the fixed wall 102.

Figure 8:
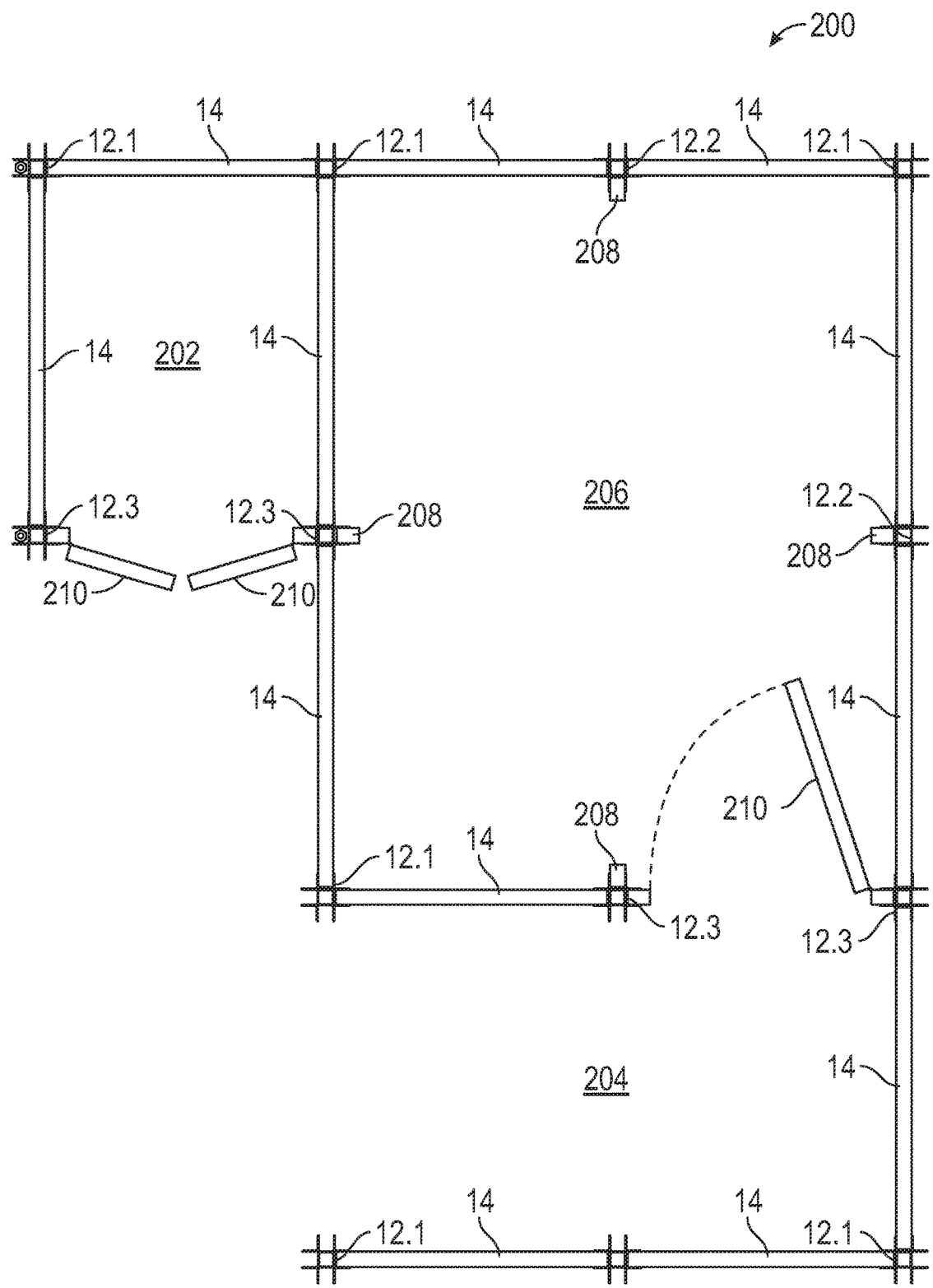
FIG. 8 is a schematic plan view showing another exemplary layout for a temporary space.

Layouts that are more complicated are readily constructed from the same kit of components. For example, FIG. 8 illustrates a partitioning system 200 configured as a multifunctional workspace having a closet area 202, an entrance hall 204 and a square office space 206. Similar to partitioning system 100, several bracket assemblies 12.1 serve as corner posts, which receive a pair of wall panels 14 oriented at 90°. Several bracket assemblies 12.2 serve as intermediate wall studs, which receive a pair of wall panels 14 oriented at 180°. A filler strip 208 may be inserted between the flanges of the bracket assembly 12.2. These filler strips 208 may be decorative or provide some functionality as further described below. In addition, several bracket assemblies 12.3 serve as door jams from which a door 210 can be hung on hinges or configured as a sliding door or barn slider (not shown). While different reference numbers are assigned to the corner brackets 12.1, the intermediate wall studs 12.2 and door jams 12.3, one skilled in the art will understand that these assembly brackets may be structurally similar to the brackets 12, 12' shown in FIGS. 3 and 4.

Figure 9:
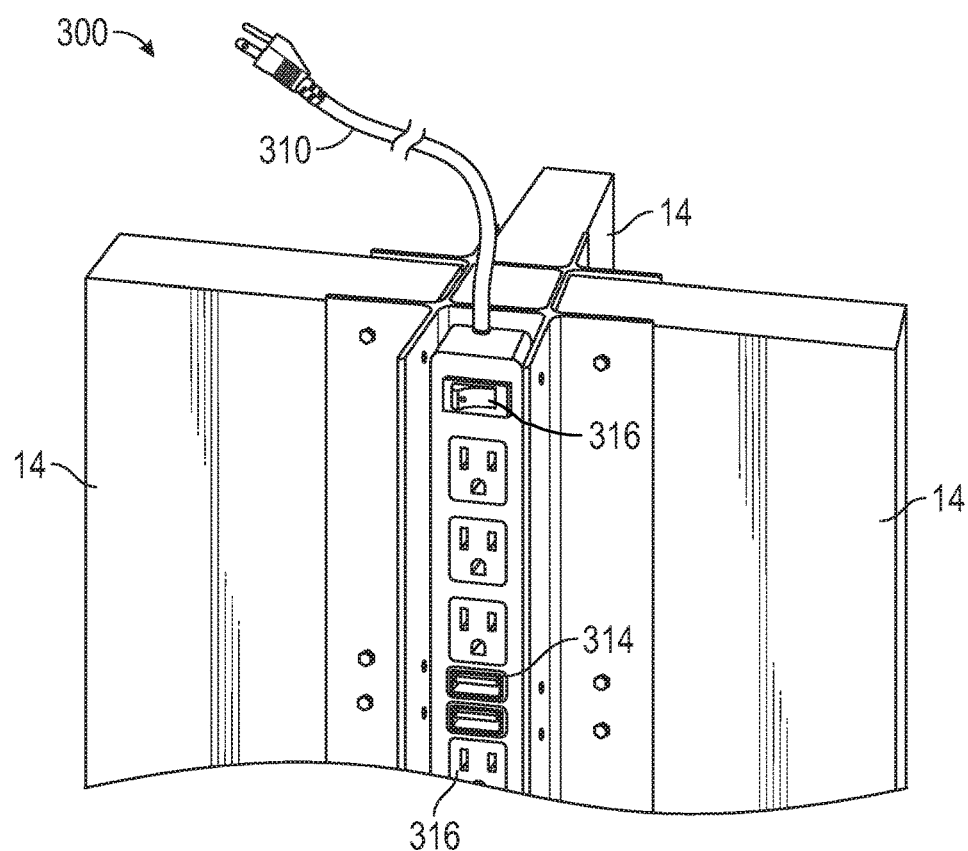
FIG. 9 is a perspective view of a temporary wall assembly having an auxiliary power strip.
Figure 10:
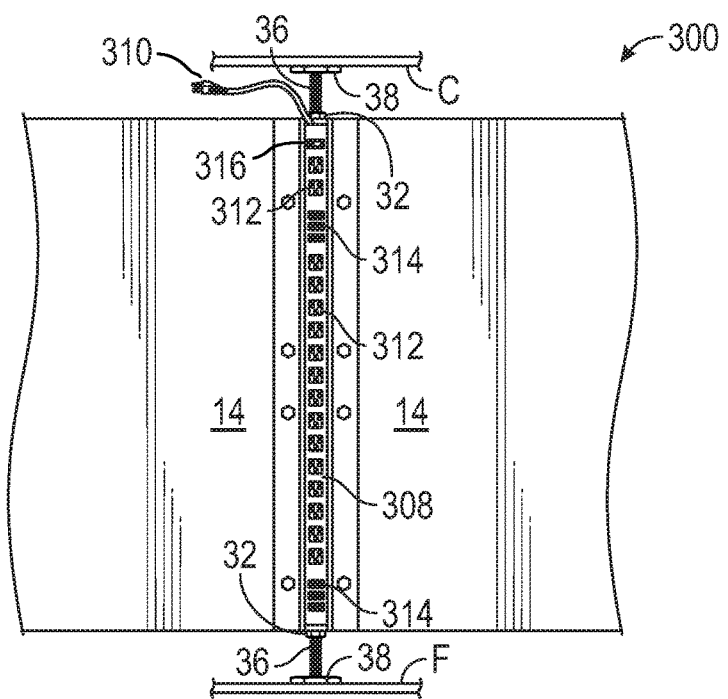
FIG. 10 is an elevation showing the assembly bracket of FIG. 9.

With reference now to FIGS. 9 and 10, a portion of a partitioning system 300 is shown to include an assembly bracket 12 supporting wall panels 14. Flanges 22, 24 extending from the assembly bracket 12 receive a filler strip in the form of a power strip 308 having a power cord 310 and a plurality of power outlets 312. The power cord 310 may be plugged into an electrical service circuit (not shown) wired along the ceiling C of an open building space. The power strip 308 may include LEDs or other lights 314 for indicating the power status of the power strip 308 or for providing ambient or accent lighting in the workspace. The power strip 308 may also include a switch 316 for turning ON and OFF the power outlets 312 and/or the lights 314.

While FIGS. 9 and 10 illustrate a filler strip in the form of a power strip, one skilled in the art will appreciate that the filler strip may incorporate other functionality. For example, the filler strip may be configured with a magnetic strip, a pin board, a pegboard, a coat hook, or a mount for pictures, shelves, display monitors, desktops or the like.

The individual components of a partitioning system 10 described herein may be compiled and provided as a kit that includes a plurality of assembly brackets 12, 12', 50, 60, 70 and a plurality of wall panels 14 with the associated hardware such as feet 16, height adjustment elements 18 and fasteners 42. Alternately, if the end user wants to incorporate standard building materials, the assembly brackets and associated hardware may be provided separately.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A temporary, non-fixed partitioning system comprising:
    a plurality of assembly brackets, wherein each assembly bracket comprises an elongated member having four walls forming a closed central section, a pair of flanges extending outwardly from each of the four walls to form a hash mark cross section, and a fillet formed at each joint between an outer surface of adjacent flanges, wherein each pair of flanges is laterally offset from the central section such that an inner surface of the flange aligns with an outer surface of a wall parallel to the flange; and
    a wall panel having a first edge received within a pair of flanges formed on a first assembly bracket and a second edge received within a pair of flanges formed on a second assembly bracket.

2. The temporary, non-fixed partitioning system according to claim 1, further comprising:
    a first wall panel having a first edge received within a pair of flanges formed on a first assembly bracket and a second edge received within a first pair of flanges formed on a second assembly bracket; and
    a second panel having a third edge received within a second pair of flanges formed on the second assembly bracket and a fourth edge received within a pair of flanges formed on a third assembly bracket;
    wherein the first and second wall panels are arranged parallel to one another.

3. The temporary, non-fixed partitioning system according to claim 2, further comprising a third wall panel having a fifth edge received within another pair of flanges formed on the first assembly bracket and a sixth edge received within a pair of flanges formed on a fourth assembly bracket, wherein the first and third wall panels are arranged perpendicular to one another.

4. The temporary, non-fixed partitioning system according to claim 1, wherein the wall panel comprises a corrugated cardboard panel.

5. The temporary, non-fixed partitioning system according to claim 1, wherein the wall panel is selected from the group consisting of a standard door slab, a standard window sash, standard dimensional lumber, a peg board, a chalk board, a whiteboard, a foam board, a gator board, a fiberglass panel, a cork panel, a plastic panel, an upholstered panel, a wood panel, and an acrylic-based or silica-based glass panel.

6. The temporary, non-fixed partitioning system according to claim 1, wherein each assembly bracket further comprises a plug received within the central section at an end of assembly bracket, the plug having a threaded bore formed therethrough configured to receive a threaded shank of a height adjustment element.

7. The temporary, non-fixed partitioning system according to claim 1, further comprising a plurality of fasteners, wherein each flange has at least one fastener extending therethrough into the wall panel for releasably securing the wall panel to the assembly bracket.

8. A kit for constructing a temporary, non-fixed partitioning system comprising:
    a plurality of assembly brackets, wherein each assembly bracket comprises an elongated member having four walls forming a closed central section, a pair of flanges extending outwardly from each of the four walls to form a hash mark cross section, and a fillet formed at each joint between an outer surface of adjacent flanges, wherein each pair of flanges is laterally offset from the central section such that an inner surface of the flange aligns with an outer surface of a wall parallel to the flange;
    a plurality of wall panels, wherein each wall panel having a first edge configured to be received within a first pair of flanges formed on a first assembly bracket and a second edge configured to be received within a second pair of flanges formed on a second assembly bracket;
    a plurality of fasteners, wherein each flange has a hole formed therethrough that is configured to receive at least one fastener such that the fastener extends into the wall panel for releasably securing the wall panel to the assembly bracket.

9. The kit according to claim 8 wherein each assembly bracket includes a plug received within the central section at an end of assembly bracket and having a threaded bore formed therein, the kit further comprising a plurality of adjustment elements, wherein each adjustment element includes head formed on a threaded shank configured to be received in the threaded bore.

10. The kit according to claim 8, wherein the wall panel comprises a corrugated cardboard panel.

11. The kit according to claim 8, wherein the wall panel is selected from the group consisting of a standard door slab, a standard window sash, standard dimensional lumber, a peg board, a chalk board, a whiteboard, a foam board, a gator board, a fiberglass panel, a cork panel, a plastic panel, an upholstered panel, a wood panel, and an acrylic-based or silica-based glass panel.

12. The kit according to claim 8 further comprising a plurality of shims, wherein each shim is configured to be disposed on an edge of a wall panel and received between a pair of flanges.

13. The temporary, non-fixed partitioning system according to claim 1, further comprising a fillet formed at each joint between the outer surface of the wall and the inner surface of an adjacent flange.

14. The kit according to claim 8, further comprising a fillet formed at each joint between the outer surface of the wall and the inner surface of an adjacent flange.

* * * * *